US012190675B2

(12) United States Patent
Bryant

(10) Patent No.: US 12,190,675 B2
(45) Date of Patent: Jan. 7, 2025

(54) GAMING MACHINE HAVING INDEPENDENT CONTROLS AND DISPLAYS FOR SINGLE AND MULTI-PLAYER PLAY

(71) Applicant: Aristocrat Technologies Australia Pty Limited, North Ryde (AU)

(72) Inventor: Natalie Bryant, Cherrybrook (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 76 days.

(21) Appl. No.: 18/137,838

(22) Filed: Apr. 21, 2023

(65) Prior Publication Data

US 2023/0252841 A1 Aug. 10, 2023

Related U.S. Application Data

(62) Division of application No. 16/122,593, filed on Sep. 5, 2018, now Pat. No. 11,636,725.

(30) Foreign Application Priority Data

Sep. 5, 2017 (AU) ................................ 2017903582

(51) Int. Cl.
*G07F 17/32* (2006.01)
*G07F 17/34* (2006.01)

(52) U.S. Cl.
CPC ...... *G07F 17/3213* (2013.01); *G07F 17/3248* (2013.01); *G07F 17/3274* (2013.01); *G07F 17/34* (2013.01)

(58) Field of Classification Search
CPC ............. G07F 17/3213; G07F 17/3248; G07F 17/3274; G07F 17/34
See application file for complete search history.

(56) References Cited

U.S. PATENT DOCUMENTS

| | | | |
|---|---|---|---|
| 2002/0155873 A1 | 10/2002 | Berman | |
| 2004/0198485 A1 | 10/2004 | Loose | |
| 2006/0258422 A1* | 11/2006 | Walker | G07F 17/32 463/7 |
| 2007/0060323 A1 | 3/2007 | Isaac | |
| 2008/0102923 A1 | 5/2008 | Esses | |
| 2008/0108411 A1 | 5/2008 | Jensen | |
| 2009/0227350 A1 | 9/2009 | Inamura | |

(Continued)

OTHER PUBLICATIONS

Office Action dated Mar. 20, 2020, for U.S. Appl. No. 16/122,593 (pp. 1-12).

(Continued)

*Primary Examiner* — Thomas H Henry

(74) *Attorney, Agent, or Firm* — McAndrews, Held & Malloy, Ltd.

(57) ABSTRACT

A gaming machine and method comprising independent displays and controls to play a game individually or as a group game between players. The gaming machine comprises a controller that controls, in individual games or group games and irrespective of wagers applied, each reel of a first set of reels and a second set of reels spin to a respective stop position to thereby select, at a conclusion of spinning, symbols that fill a first set of columns of symbol display positions and a second set of columns of symbol display positions, and evaluates the symbols displayed in the first set of columns of symbol display positions based on a pay table and wagers.

20 Claims, 10 Drawing Sheets

(56) References Cited

U.S. PATENT DOCUMENTS

| | | | | |
|---|---|---|---|---|
| 2010/0197385 | A1* | 8/2010 | Aoki | G07F 17/3225 463/31 |
| 2013/0303249 | A1* | 11/2013 | Acres | G07F 17/34 463/20 |
| 2014/0087820 | A1 | 3/2014 | Brune | |
| 2014/0256411 | A1 | 9/2014 | Basallo | |
| 2018/0130286 | A1 | 5/2018 | Berman | |

OTHER PUBLICATIONS

Notice of Allowance dated May 28, 2020 for U.S. Appl. No. 16/122,788 (pp. 1-5).
Office Action dated Apr. 5, 2021 for U.S. Appl. No. 16/122,593 (pp. 1-11).
Office Action (Non-Final Rejection) dated Jul. 20, 2021 for U.S. Appl. No. 16/122,593 (pp. 1-11).
Office Action (Non-Final Rejection) dated Aug. 27, 2021 for U.S. Appl. No. 16/987,709 (pp. 1-10).
Office Action (Final Rejection) dated Apr. 18, 2022 for U.S. Appl. No. 16/122,593 (pp. 1-12).
Office Action (Final Rejection) dated Jan. 14, 2022 for U.S. Appl. No. 16/987,709 (pp. 1-12).
Office Action (Notice of Allowance and Fees Due (PTOL-85)) dated Jul. 12, 2022 for U.S. Appl. No. 16/987,709 (pp. 1-7).
Office Action (Non-Final Rejection) dated Aug. 11, 2022 for U.S. Appl. No. 16/122,593 (pp. 1-9).
Office Action (Notice of Allowance and Fees Due (PTOL-85)) dated Dec. 28, 2022 for U.S. Appl. No. 16/122,593 (pp. 1-8).
Australian Examination Report No. 1 for App. No. AU2018222966, dated Jun. 30, 2023 (pp. 1-4).

* cited by examiner

GAMING MACHINE HAVING INDEPENDENT CONTROLS AND DISPLAYS FOR SINGLE AND MULTI-PLAYER PLAY

RELATED APPLICATION

The present application is a divisional application of and claims priority to U.S. patent application Ser. No. 16/122,593, filed Sep. 5, 2018, and entitled "Gaming Machine Having Independent Controls and Displays for Single and Multi-Player Play" which claims priority to Australian Patent Application No. AU2017903582, having a filing date of Sep. 5, 2017, which are hereby incorporated by reference in their entireties.

BACKGROUND

The present disclosure relates to a gaming machine and a method of operating a gaming machine.

Gaming machines are known where a single player can play multiple simultaneous games. U.S. Pat. No. 6,652,378 to Cannon et al, describes an arrangement where windows are added to a gaming machine so that there are separate windows for each of the games being played by the player and the number of windows displayed at any time is dependent on player selections.

A need exists for alternative gaming machine.

SUMMARY

In a first aspect, the disclosure provides an electronic gaming machine comprising a first set of reels corresponding to a first set of columns of symbol display positions, each first reel comprising a plurality of symbols of a symbol set; a second set of reels corresponding to a second set of columns of symbol display positions, each second reel comprising a plurality of symbols of the symbol set; a memory storing a pay table defining awards for winning combinations of symbols applicable to each of the first and second sets of columns of symbol display positions; and a game controller configured to: operate in a one-player mode or a two-player mode responsive to at least one instruction input to the gaming machine; control, when operating in either the one-player mode or a two-player mode, each reel of the first and second sets of reels to spin to a respective stop position to thereby select, at the conclusion of the spinning, symbols that fill the columns of symbol display positions; and in the two-player mode: evaluate the symbols displayed in the first set of columns of symbol display positions based on the pay table and make any awards for winning combinations of symbols to a first player; evaluate the symbols displayed in the second set of columns of symbol display positions based on the pay table and make any awards for winning combinations of symbols to a second player; evaluate the symbols displayed in the first and second sets of columns of symbol display positions to determine whether a trigger condition is met; and upon the trigger condition being met, conduct additional game play corresponding to the trigger condition for each of the first and second players; or in the one-player mode: evaluate at least the symbols displayed in the first set of columns of symbol display positions based on the pay table and make any awards for winning combinations of symbols to the first player; evaluate the symbols displayed in the first and second sets of columns of symbol display positions to determine whether a trigger condition is met; and upon the trigger condition being met, conduct additional game play corresponding to the trigger condition for the first player.

In an embodiment, the game controller is responsive to an additional instruction in the one-player mode to also evaluate the symbols displayed in the second set of columns of symbol display positions based on the pay table and make any awards for winning combinations of symbols to the first player.

In an embodiment, the gaming machine comprises a plurality of buttons for inputting instructions into the electronic gaming machine.

In an embodiment, the plurality of buttons comprise virtual buttons displayed on a touch screen display of the gaming machine.

In an embodiment, the plurality of buttons comprise reconfigurable physical buttons.

In an embodiment, the plurality of buttons include at least one button operable to select between the one-player mode and the two-player mode.

In an embodiment, in the two-player mode, the plurality of buttons include buttons to enable each of the first and second players to independently specify one of a plurality of different wager amounts to apply to symbols displayed in the first and second sets of columns of symbol display positions respectively.

In an embodiment, in the one-player mode, the plurality of buttons include buttons to enable the first player to independently specify one of a plurality of different wager amounts to apply to symbols displayed in the first and second sets of columns of symbol display positions respectively, and wherein one button corresponds to a zero wager in respect of one of the first and second sets of columns of symbol display positions.

In an embodiment, the game controller is configured so that in the one-player mode, the gaming machine defaults to activating the button corresponding to a zero wager.

In an embodiment, the button corresponding to a zero wager is associated with the second set of symbol display positions.

In an embodiment, the symbol set comprises at least one symbol that can occupy more than one symbol display position and that is evaluated as individual instances of that symbol in respect of each symbol display position occupied.

In a second aspect, the disclosure provides a method of operating an electronic gaming machine comprising a first set of reels corresponding to a first set of columns of symbol display positions, each first reel comprising a plurality of symbols of a symbol set, a second set of reels corresponding to a second set of columns of symbol display positions, each second reel comprising a plurality of symbols of the symbol set, a memory storing a pay table defining awards for winning combinations of symbols applicable to each of the first and second sets of columns of symbol display positions, and a game controller configured to operate in a one-player mode or a two-player mode responsive to at least one instruction input to the gaming machine. The method comprises controlling, when operating in either the one-player mode or a two-player mode, each reel of the first and second sets of reels to spin to a respective stop position to thereby select, at the conclusion of the spinning, symbols that fill the columns of symbol display positions. The method also includes in the two-player mode: evaluating the symbols displayed in the first set of columns of symbol display positions based on the pay table and make any awards for winning combinations of symbols to a first player, evaluating the symbols displayed in the second set of columns of symbol display positions based on the pay table and make any awards for winning combinations of symbols to a second player, evaluating the symbols displayed in the first and second sets of columns of symbol display positions to determine whether a trigger condition is met, and upon the trigger condition being met, conducting additional game play corresponding to the trigger condition for each of the first and second players. The method also includes in the one-player mode: evaluating at least the symbols displayed in the first set of columns of symbol display positions based on the pay table and make any awards for winning combinations of symbols to the first player, evaluating the symbols displayed in the first and second sets of columns of symbol display positions to determine whether a trigger condition is met, and upon the trigger condition being met, conducting additional game play corresponding to the trigger condition for the first player.

In a third aspect, the disclosure provides an electronic gaming machine comprising: a first set of reels corresponding to a first set of columns of symbol display positions, each first reel comprising a plurality of symbols of a symbol set; and a second set of reels corresponding to a second set of columns of symbol display positions, each second reel comprising a plurality of symbols of the symbol set; and a memory storing a pay table defining awards for winning combinations of symbols applicable to each of the first and second sets of columns of symbol display positions; a plurality of buttons including first buttons to enable a first wager to be selected from one of a first plurality of different positive credit value wager amounts, the first wager applying to symbols displayed in the first set of columns of symbol display positions, and second buttons to enable a second wager amount to be selected from a zero amount and one of a second plurality of positive credit value wager amounts, the second wager applying to symbols displayed in the second set of columns of symbol display positions; a game controller configured to: control, irrespective of the wagers applied to each of the first and second sets of columns, each reel of the first and second sets of reels to spin to a respective stop position to thereby select, at the conclusion of the spinning, symbols that fill the columns of symbol display positions; evaluate the symbols displayed in the first set of columns of symbol display positions based on the pay table and the first wager, and make any awards for winning combinations of symbols; and evaluate the symbols displayed in the second set of columns of symbol display positions based on the pay table and the second wager, and make any awards for winning combinations of symbols, wherein a zero wager amount results in no award.

In an embodiment, the game controller is configured to evaluate the symbols displayed in the first and second sets of columns of symbol display positions to determine whether a trigger condition is met; and upon the trigger condition being met, conduct additional game play corresponding to the trigger condition.

In a fourth aspect, the disclosure provides a method of operating an electronic gaming machine comprising: a first set of reels corresponding to a first set of columns of symbol display positions, each first reel comprising a plurality of symbols of a symbol set; a second set of reels corresponding to a second set of columns of symbol display positions, each second reel comprising a plurality of symbols of the symbol set; a memory storing a pay table defining awards for winning combinations of symbols applicable to each of the first and second sets of columns of symbol display positions; and a plurality of buttons including first buttons to enable a first wager to be selected from one of a first plurality of different positive credit value wager amounts, the first wager applying to symbols displayed in the first set of columns of symbol display positions, and second buttons to enable a second wager amount to be selected from a zero amount and one of a second plurality of positive credit value wager amounts, the second wager applying to symbols displayed in the second set of columns of symbol display positions. The method comprises controlling, irrespective of the wagers applied to each of the first and second sets of columns, each reel of the first and second sets of reels to spin to a respective stop position to thereby select, at the conclusion of the spinning, symbols that fill the columns of symbol display positions; evaluating the symbols displayed in the first set of columns of symbol display positions based on the pay table and the first wager, and make any awards for winning combinations of symbols; and evaluating the symbols displayed in the second set of columns of symbol display positions based on the pay table and the second wager, and make any awards for winning combinations of symbols, wherein a zero wager amount results in no award.

In an embodiment, the method comprises: evaluating the symbols displayed in the first and second sets of columns of symbol display positions to determine whether a trigger condition is met; and upon the trigger condition being met, conducting additional game play corresponding to the trigger condition.

In a fifth aspect, the disclosure provides an electronic gaming machine comprising: a first set of reels corresponding to a first set of columns of symbol display positions, each first reel comprising a plurality of symbols of a symbol set; a second set of reels corresponding to a second set of columns of symbol display positions, each second reel comprising a plurality of symbols of the symbol set; a memory storing a pay table defining awards for winning combinations of symbols applicable to each of the first and second sets of columns of symbol display positions; a plurality of buttons including first buttons to enable a first wager to be selected from one of a plurality of different first wager amounts, the first wager applying to symbols displayed in the first set of columns of symbol display positions, and second buttons to enable a second wager amount to be selected from a plurality of second wager amounts, the second wager applying to symbols displayed in the second set of columns of symbol display positions; and a game controller configured to: control, irrespective of the wagers applied to each of the first and second sets of columns, each reel of the first and second sets of reels to spin to a respective stop position to thereby select, at the conclusion of the spinning, symbols that fill the columns of symbol display positions; evaluate the symbols displayed in the first set of columns of symbol display positions based on the pay table and the first wager, and make any awards for winning combinations of symbols; evaluate the symbols displayed in the second set of columns of symbol display positions based on the pay table and the second wager, and make any awards for winning combinations of symbols; evaluate the symbols displayed in the first and second sets of columns of symbol display positions to determine whether a trigger condition is met; and upon the trigger condition being met, conduct additional game play corresponding to the trigger condition.

In a sixth aspect, the disclosure provides a method of operating an electronic gaming machine comprising: a first set of reels corresponding to a first set of columns of symbol display positions, each first reel comprising a plurality of symbols of a symbol set; a second set of reels corresponding to a second set of columns of symbol display positions, each second reel comprising a plurality of symbols of the symbol set; and a memory storing a pay table defining awards for winning combinations of symbols applicable to each of the first and second sets of columns of symbol display positions; and a plurality of buttons including first buttons to enable a first wager to be selected from one of a plurality of different first wager amounts, the first wager applying to symbols displayed in the first set of columns of symbol display positions, and second buttons to enable a second wager amount to be selected from a plurality of second wager amounts, the second wager applying to symbols displayed in the second set of columns of symbol display positions. The method comprises controlling, irrespective of the wagers applied to each of the first and second sets of columns, each reel of the first and second sets of reels to spin to a respective stop position to thereby select, at the conclusion of the spinning, symbols that fill the columns of symbol display positions; evaluating the symbols displayed in the first set of columns of symbol display positions based on the pay table and the first wager, and make any awards for winning combinations of symbols; evaluating the symbols displayed in the second set of columns of symbol display positions based on the pay table and the second wager, and make any awards for winning combinations of symbols; evaluating the symbols displayed in the first and second sets of columns of symbol display positions to determine whether a trigger condition is met; and upon the trigger condition being met, conducting additional game play corresponding to the trigger condition.

In a seventh aspect, the disclosure provides an electronic gaming machine comprising: a first set of reels corresponding to a first set of columns of symbol display positions, each first reel comprising a plurality of symbols of a symbol set; a second set of reels corresponding to a second set of columns of symbol display positions, each second reel comprising a plurality of symbols of the symbol set; a memory storing a) a pay table defining awards for winning combinations of symbols applicable to each of the first and second sets of columns of symbol display positions, and b) a plurality of meters; and a game controller configured to operate in a one-player mode or a two-player mode responsive to at least one instruction input to the gaming machine, control the display to display at least a subset of the meters, and respond to switching between the one-player mode and the two-player mode by changing the display of the at least a subset of the meters on the display.

In an embodiment, the controller changes the appearance of at least one of the meters.

In an embodiment, the controller adds at least one meter or removes at least one meter from the meters displayed on the display.

In an eighth aspect, the disclosure provides a method of operating an electronic gaming machine comprising: a first set of reels corresponding to a first set of columns of symbol display positions, each first reel comprising a plurality of symbols of a symbol set; a second set of reels corresponding to a second set of columns of symbol display positions, each second reel comprising a plurality of symbols of the symbol set; a memory storing a) a pay table defining awards for winning combinations of symbols applicable to each of the first and second sets of columns of symbol display positions, and b) a plurality of meters. The method comprising: operating in a one-player mode or a two-player mode responsive to at least one instruction input to the gaming machine, controlling the display to display at least a subset of the meters, and responding to switching between the one-player mode and the two-player mode by changing the display of the at least a subset of the meters on the display.

In a ninth aspect, the disclosure provides a computer program code which when executed implements the above method.

In a tenth aspect, the disclosure provides a tangible computer readable medium comprising the above program code.

BRIEF DESCRIPTION OF THE DRAWINGS

An exemplary embodiment of the disclosure will now be described with reference to the accompanying drawings in which.

DETAILED DESCRIPTION

Figure 1:
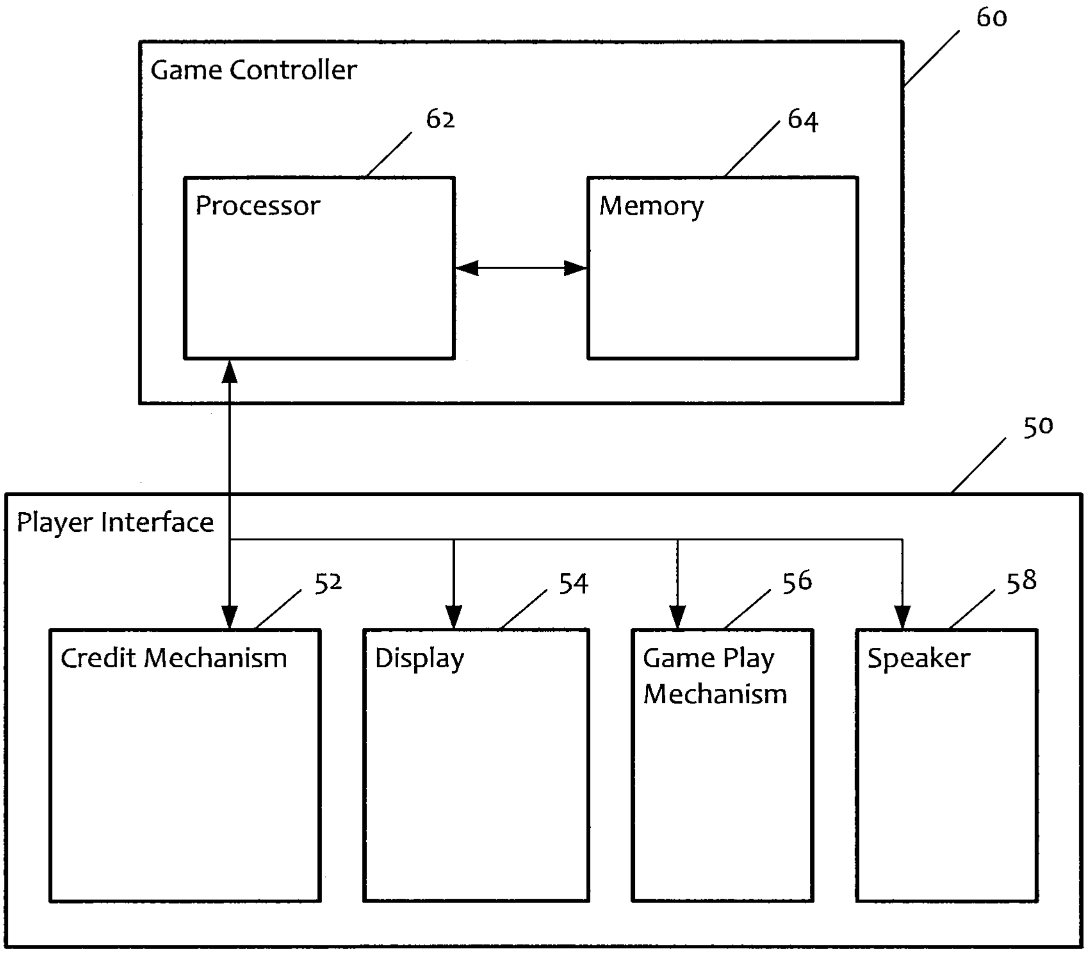
FIG. 1 is a block diagram of the core components of a gaming system.

Referring to the drawings, there is shown a gaming machine that is operable in a one-player mode and a two-player mode. The gaming machine has two sets of reels which are spun each time the game is played. In an embodiment, this allows the symbols spun up on both sets of reels to be evaluated to determine whether they individually or collectively trigger further game play irrespective of whether the gaming machine is being played in the one-player mode or the two-player mode. In an embodiment, the player(s) can wager different amounts in respect of each set of reels. In an embodiment, in the one-player mode, the player has the option to wager zero credits in respect of one of the sets of reels whereby otherwise winning outcomes on this set of reels result in no awards. The gaming machine having a game controller having components that enable the implementation of a game The gaming machine has several core components. At the broadest level, the core components are a player interface 50 and a game controller 60 as illustrated in FIG. 1. The player interface is arranged to enable manual interaction between one or two players and the gaming machine and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with program code stored in a memory 64 and outputs game play outcomes to the display. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
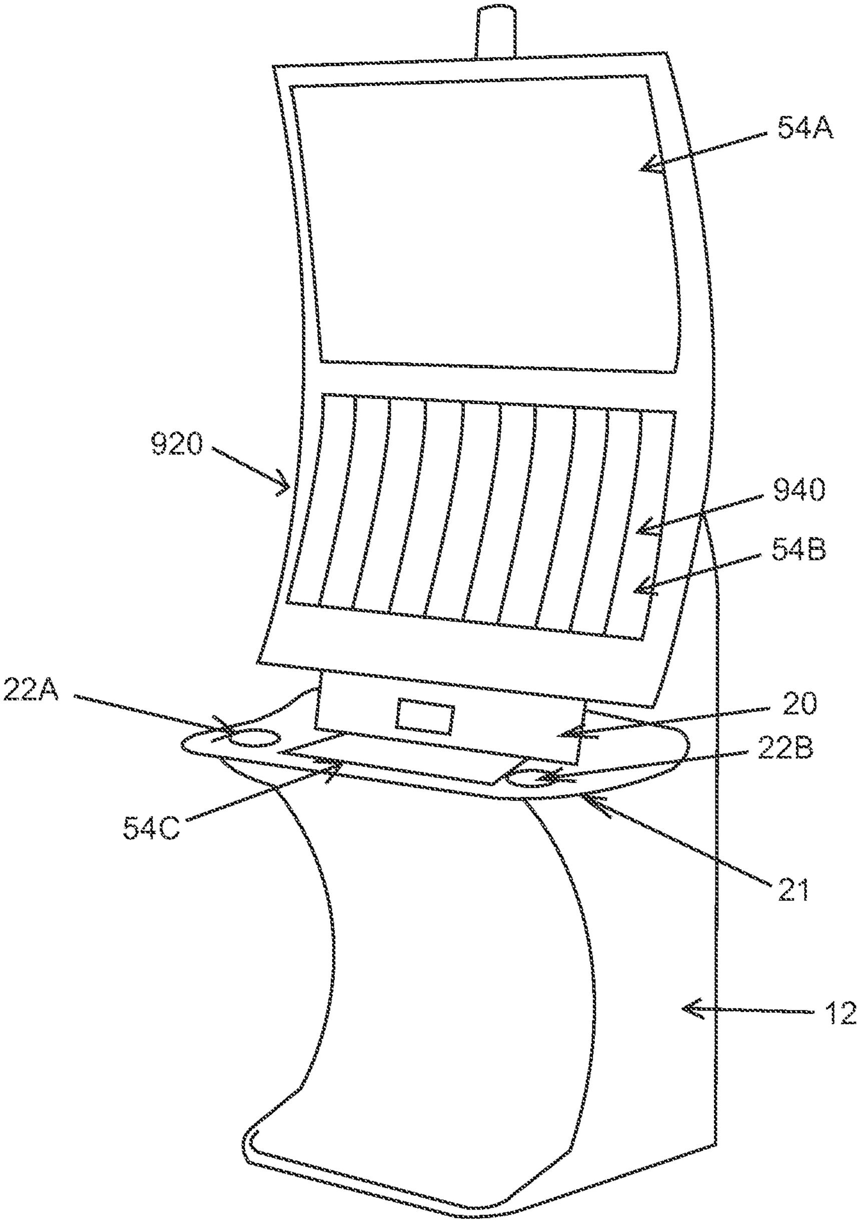
FIG. 2 is a perspective view of a gaming machine of an embodiment.

An example gaming machine 10 is illustrated in FIG. 2. The gaming machine 10 includes a console 12 having an upper display 54A and a lower display 54B on which are displayed representations of the game that is playable on the gaming machine. Table-top 21 of the gaming machine 10 provides the game play mechanism 56 in the form of a touch screen display 54C (shown in more detail in FIG. 6) and play buttons 22A, 22B which allow one or more players to start a play of the game. Mid-trim 20 houses a credit input mechanism which in this example includes a bill collector and a ticket reader. Mid-trim 20 also has a reading device provided for the purpose of reading a player tracking device, for example as part of a loyalty program.

The displays 54A, 54B, 54C shown in FIG. 2 are liquid crystal displays. The displays 54 may any other suitable video display unit, such as an OLED display.

Figure 6:
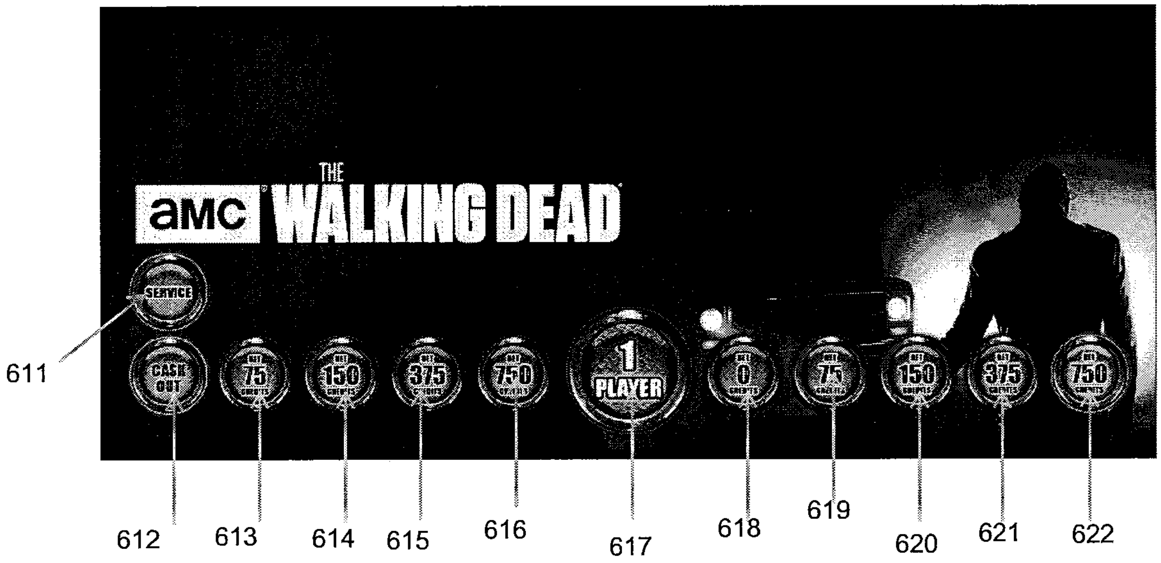
FIG. 6 illustrates an example of a game play mechanism of the gaming machine of FIG. 1.

Referring to FIG. 6, there is shown further detail of the touch screen display 54C that players use to input game play instructions. The touch screen display 54C displays a plurality of buttons 611 to 622. The buttons include service button 611 and cash out button 612. Mode selection button 617 allows players to select between single and two player modes. In FIG. 6, button 617 shows that the single player mode is active. Buttons 613 to 616 allow the player to select between four different positive credit value wagers to place on a first set of reels. Buttons 618 to 621 allow the player to select between five different wagers to place on a second set of reels including button 618 which allows the player to select a zero credit wager.

In another embodiment, the buttons are provided as physical buttons, for example, reconfigurable buttons that can indicate the difference in the manner they operate in dependence of the mode. For example, the buttons may incorporate a small display that indicates the function they perform.

Figure 3:
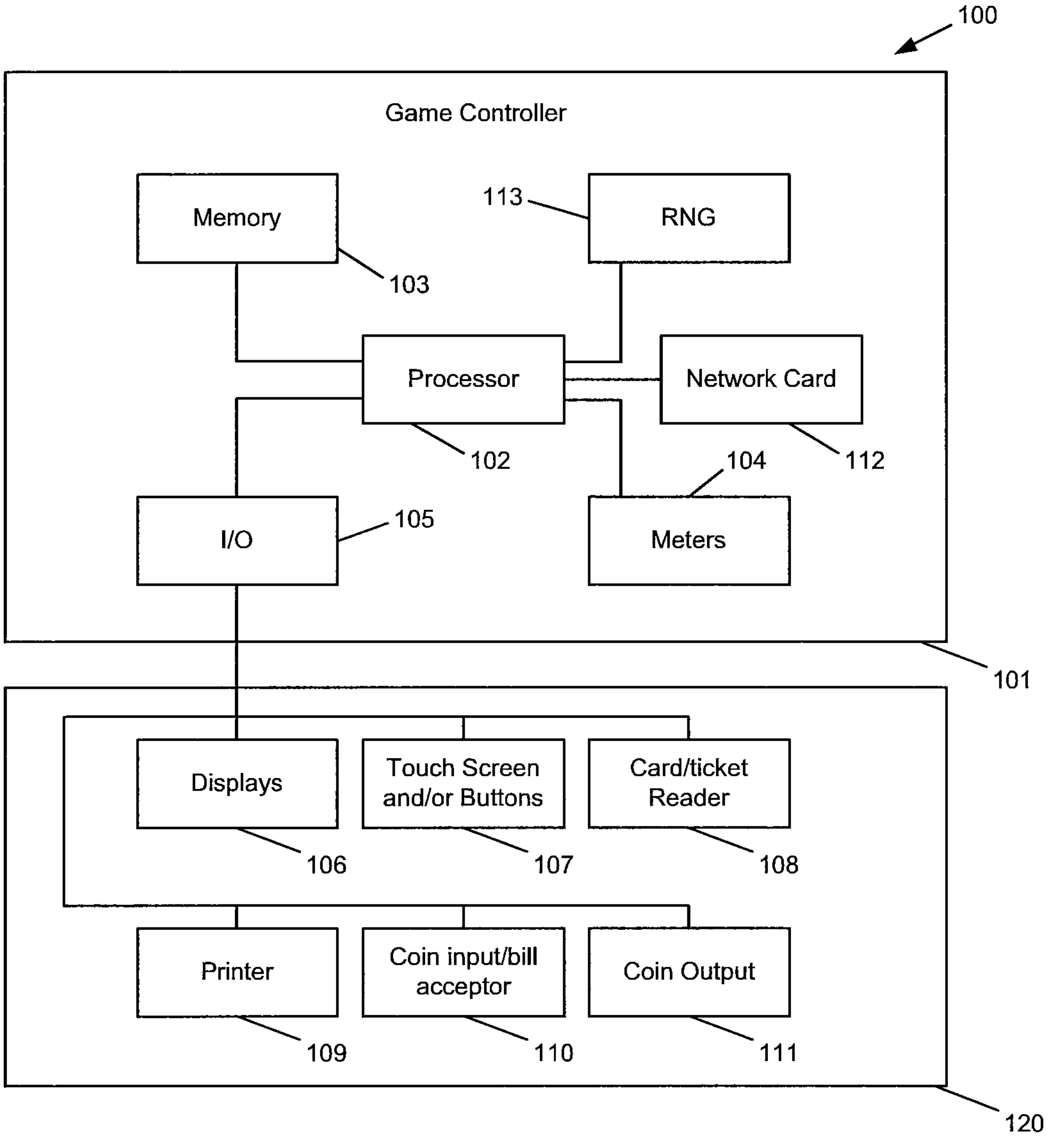
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. In some embodiments, the bill acceptor and/or coin input mechanism 110 may also function as a "ticket-in" reader that allows the player to use a casino issued credit ticket to load credits onto the gaming device 104A (e.g., in a cashless ticket ("TITO") system). In such cashless embodiments, the "ticket-out" printer 109 can be used for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using the ticket-out printer 109 on the gaming machine 100. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
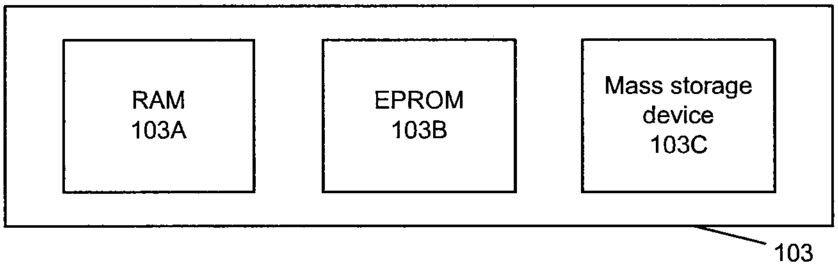
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices such as displays 106, touch screen and/or buttons 107, card and/or ticket reader 108, printer 109, bill acceptor and/or coin input mechanism 110, and coin output mechanism 111 to be provided remotely from the game controller 101.

Figure 5:
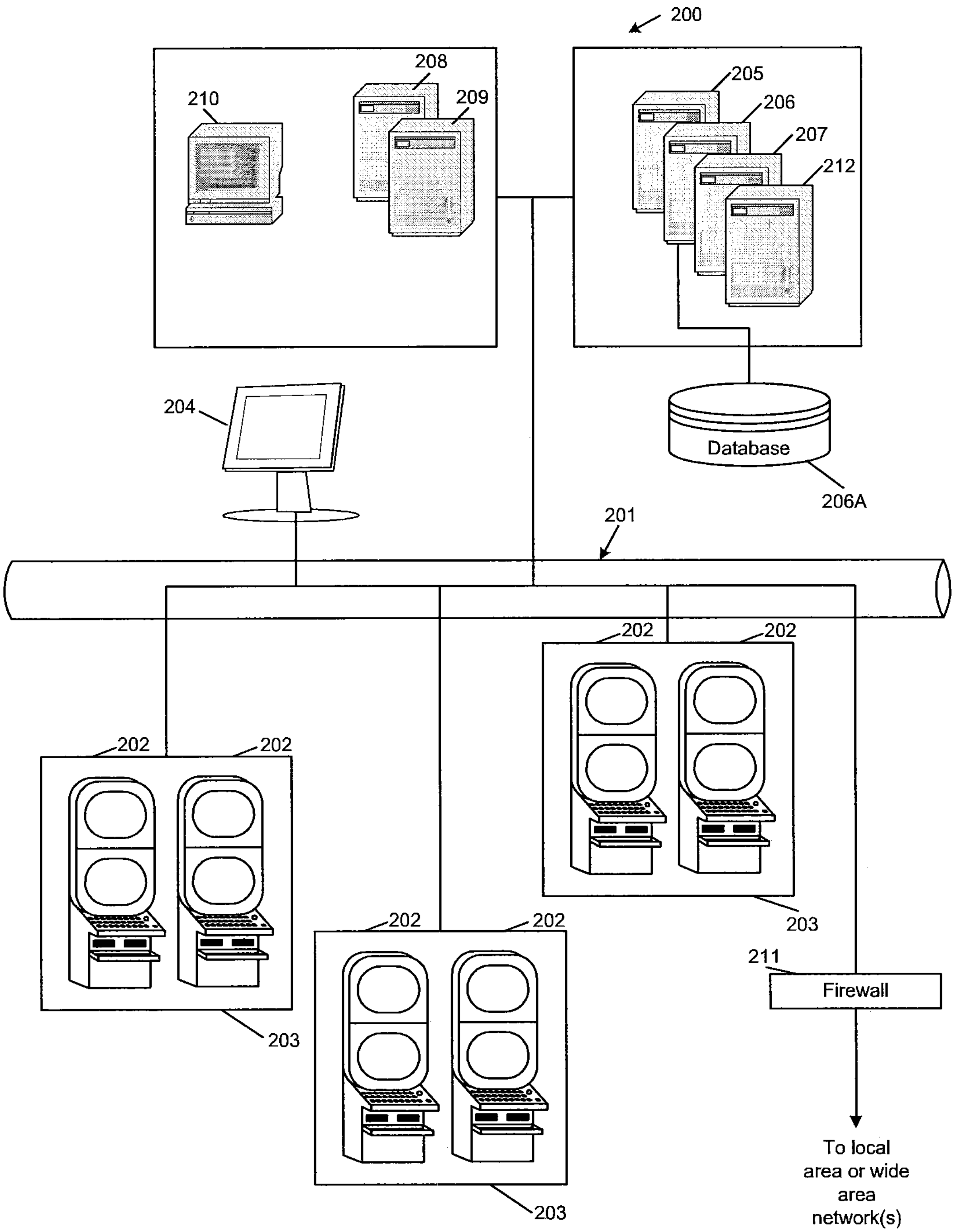
FIG. 5 is a schematic diagram of a gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 may be the same as the gaming machines 10, 100 shown in FIG. 2 or a number of different types of gaming machines. While banks 203 of two gaming machines are illustrated in FIG. 5, banks of one, three or more gaming machines are also envisaged.

Typically, if the gaming system enables players to participate in a Jackpot game, a Jackpot server 207 will be provided to perform accounting functions for the Jackpot game. A loyalty program server 212 may also be provided.

Servers are also typically provided to assist in the administration of the gaming system 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided.

Further Detail of Gaming System

A player or players operate the touch screen display 54C of game play mechanism 56 to specify wagers which will be evaluated for this play of the game. The player or players use the buttons 22A/22B to start a play of the game. In a two-player mode it may be necessary for the players to each press their respective button before the game starts.

Persons skilled in the art will appreciate that a player's wager can be varied from game to game dependent on player selections. In most spinning reel games, it is typical for the player's wager to be made up of a selection as to how the game outcome will be evaluated by specifying what parts of the game outcome will qualify for winning outcomes and a multiplier that will apply to each winning outcome.

Embodiments of the disclosure use an evaluation mechanic, based on the "Reel Power" mechanic developed by Aristocrat Leisure Industries Pty Ltd which is also known as a "ways" to win mechanic. In Reel Power games, the selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the center row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win. In embodiments of the disclosure, the player is required to wager on the maximum number of "ways" to win and hence the only variation is in the amount of credits wagered by player. This allows the wager options shown in FIG. 6 to be specified simply as wager amounts in credits to provide a simplified method for the player to select a wager. In another embodiment, the player may play a fixed number of pay lines. Such pay lines are formed by a combination of symbol display positions, one from each reel, the symbol display positions typically being located relative to one another such that they form a line.

In many games, the gaming machine may award winning outcomes which are not strictly limited to the lines they have selected, for example, "scatter" pays are awarded independently of a player's selection of pay lines. In embodiments of the disclosure, such scatter combinations are used as trigger symbols that result in additional game play as described in further detail below.

In the embodiment described below, the display positions of the symbol display are arranged in a rectangular matrix comprising a plurality of columns and a plurality of rows, for example, five columns and five rows, for each of two sets of reels (i.e. 10 columns and five rows in total). However, other arrangements are known in the gaming industry and could be employed in embodiments of the disclosure. For example, in some arrangements there are more symbols in some columns than others, such as 3-4-3-4-3 arrangement of seventeen display positions corresponding to respective ones of five reels. In such arrangements, the columns of four symbols can be arranged so that they are off-set or staggered relative to the columns having three symbols so that the middle two symbols in the columns of four symbols share boundaries with two symbols of each neighboring reel.

Figure 7:
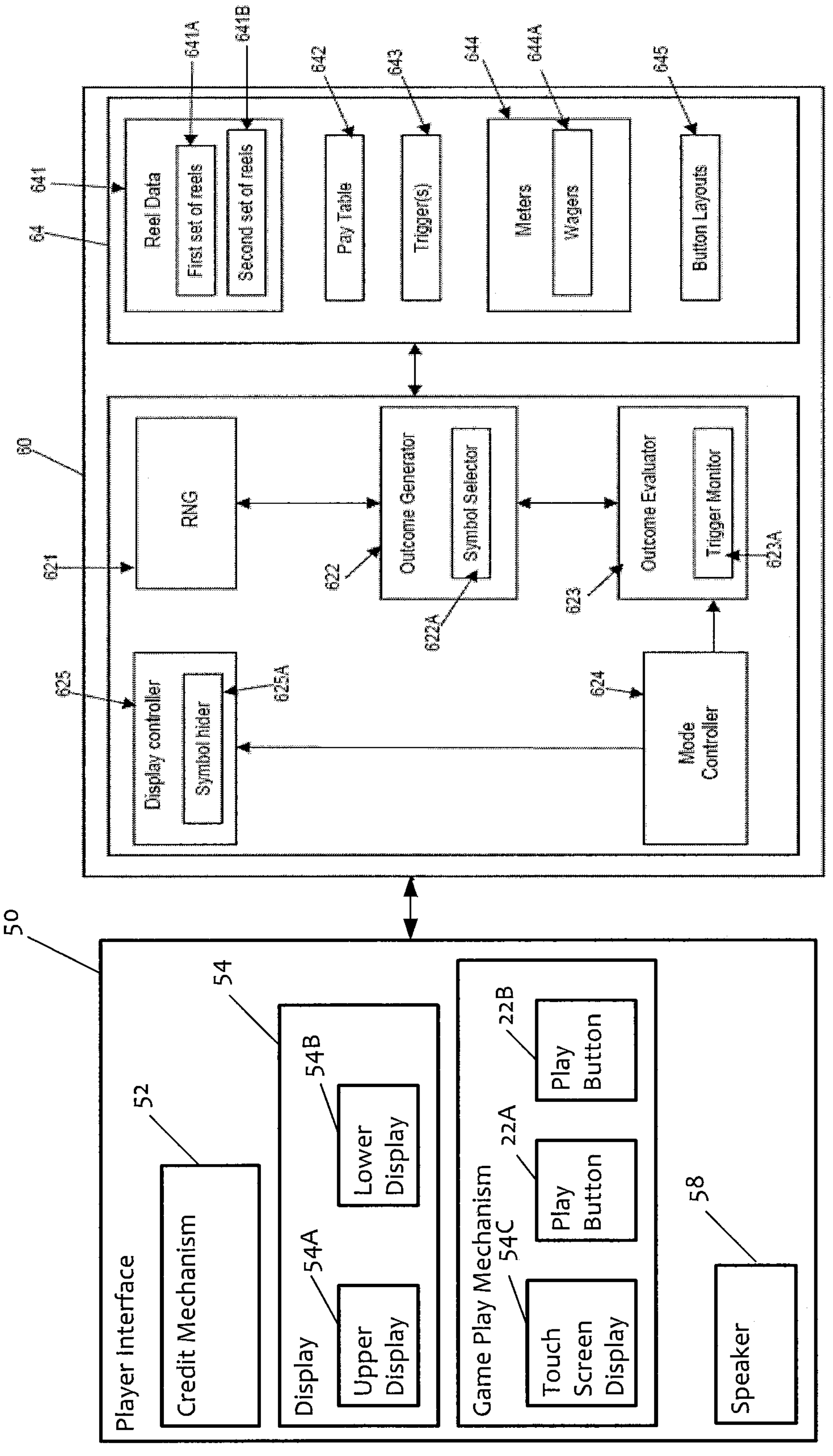
FIG. 7 is a further block diagram of the gaming machine.

In FIG. 7, the processor 62 of game controller 60 is shown implementing a number of modules based on program code and data stored in memory 64. Persons skilled in the art will appreciate that the modules could be implemented in some other way, for example by a dedicated circuit.

The player interface 50 comprises the credit mechanism 52, displays in the form of an upper display 54A and lower display 54B, the game play mechanism 56 in the form of the touch screen display 54C which displays virtual buttons and buttons 22A, 22B. The player interface also includes speakers 58.

The game controller 60 implements an outcome generator 622 which includes a single selector 622A which selects stopping positions for each reel of a first set of reels 641A and a second set of reels 641B stored in memory 64 as reel data 641. The symbol selector selects stopping positions by selecting for each reel a stopping position which corresponds to a specific position on a display. That is, each set of reels 641A, 641B corresponds to a set of symbol display positions. Each set of symbol display positions is formed from a plurality of columns of symbol display positions which is apparent from reviewing, for example FIG. 9. In embodiments of the disclosure, the first set of reels and second set of reels derive from the same set of symbols and include some symbols that act as trigger symbols. The distribution of trigger symbols across the first and second sets reels is designed to ensure that trigger conditions have the desired probability.

The game controller has an outcome evaluator 623 which evaluates game outcomes based on pay table at step 642. The outcome evaluator 623 also includes a trigger monitor 623A which determines whether one or more trigger conditions are met. The trigger conditions are stored in memory 643. Each of the trigger conditions is associated with additional game play. For example, a feature game such as a jackpot game or free spins. Any winning outcomes are credited to win meter which is stored as meters 644. Meters also store the current wagers 644A in respect of the first set of reels and the second set of reels. The memory 64 also stores two different button layouts 645 for the display 54C. The two different button layouts 645 correspond to a one and a two player mode as described in further detail below. A mode controller 624 monitors the instructions input via the touch screen display 54C to determine whether to operate the gaming machine a single or two-player mode. The display controller 625 also includes a symbol hider 625A which hides or obscures certain symbols which are not active in certain uses of the single-player modes as described in further detail below.

Figure 9:
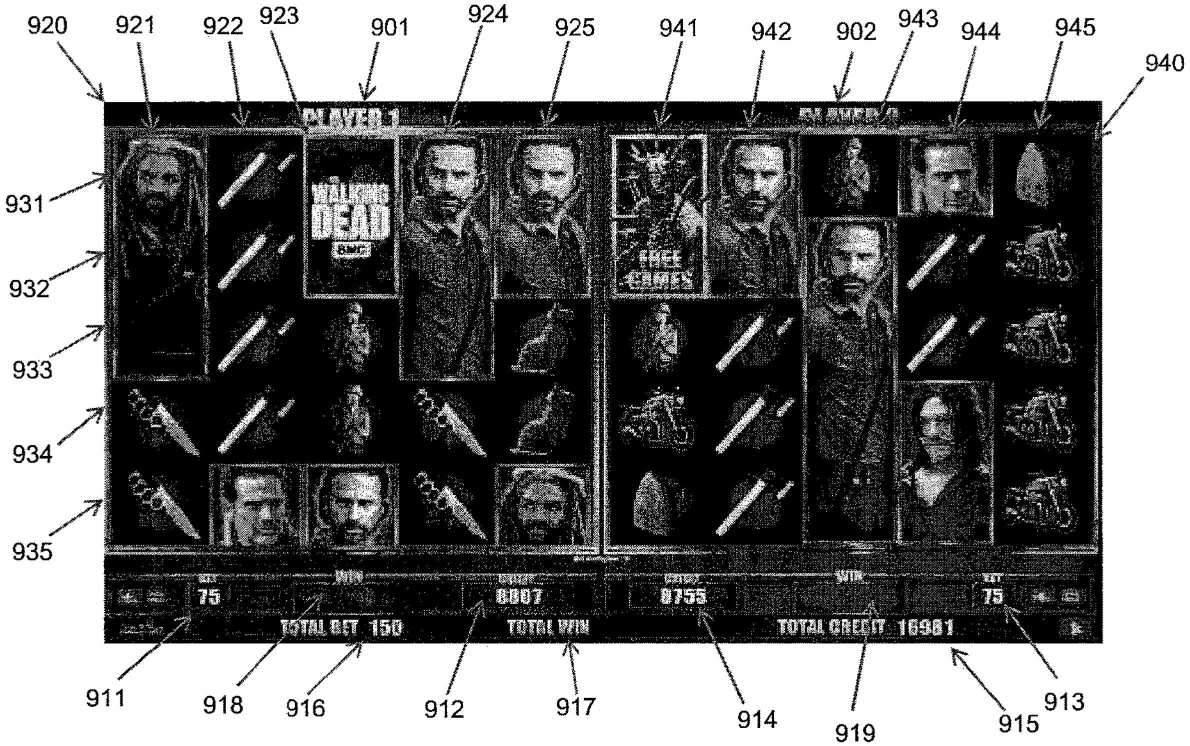
FIG. 9 is a screen shot of the gaming machine operating in a two-player mode.

The difference between the operation of the two-player mode and one-player mode is best understood by reference with the output on the displays during the respective modes. FIG. 9 shows an example screen shot displayed on the lower display 54B. From the screen shot, it can be seen that symbols selected from the first set of reels 920 are displayed in a first set of symbol display positions in a first plurality of columns 921, 922, 923, 924 and 925 and symbols from the second set of reels 940 are displayed in a second set of symbol display positions in a second plurality of columns of symbol display positions 941, 942, 943, 944. Text 901 indicates that player one plays the left set of symbol display positions (left set of reels) corresponding to the first set of reels 920 and player two 902 plays the right hand set of symbol display positions corresponding to the second set of reels 940. The symbols are displayed in five rows 931 to 935.

Figure 10:
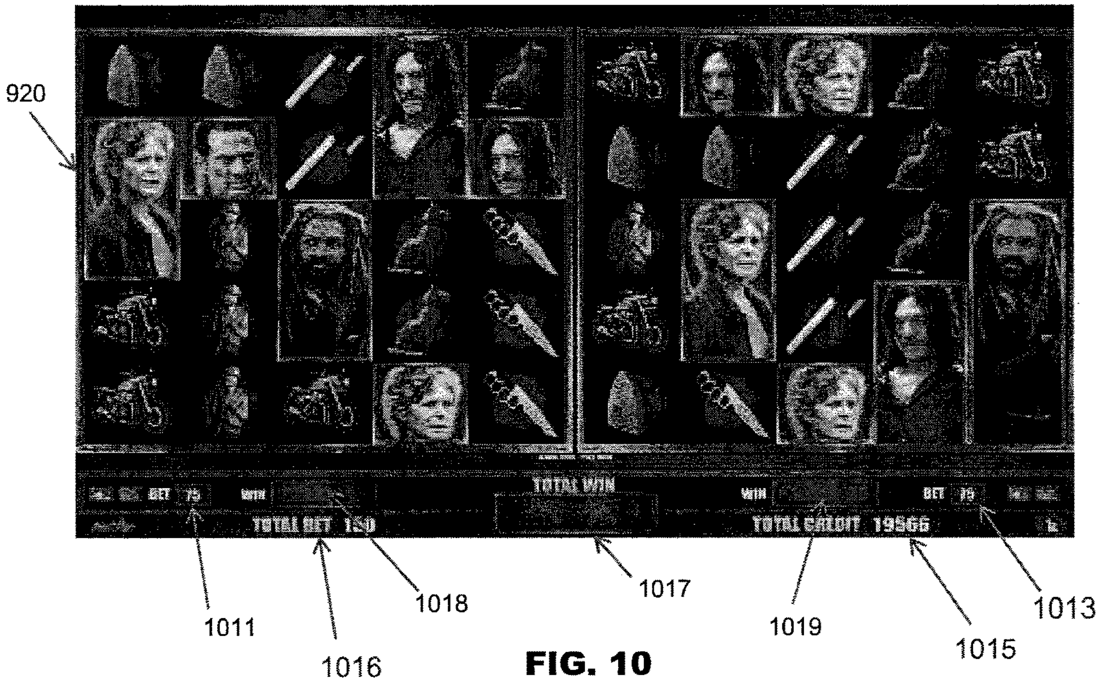
FIG. 10 is a screen shot of the gaming machine operating in a one-player mode with the player wagering seventy five (75) credits on both sets of columns of symbol display positions.

It will also be appreciated that the display 54B shows the amount bet 911 by the first player as seventy five (75) credits and the amount bet 913 by the second player as seventy five (75) credits. The display 54B also shows current credit balances 912, 914 for the first player and the second player, the total amount bet across both game instances 916 and the total credit in the gaming machine 915. As is apparent from FIG. 9, the first and second players can independently select the amount to wager on a game of the gaming machine in the two player mode (FIG. 9 shows an example where the players have elected the same wager amount). Each player can each select from a plurality of positive credit values, such as those shown in FIG. 6. As is also apparent, the appearance of the meters associated with the first and second reel sets is different between the one-player mode and two-player mode. Further, some meters that are associated with the respective sets of reels 920, 940 and some meters are associated with the both reel sets and the appearance of the meters associated with both reel sets as a whole also changes between the one-player mode and two-player mode. For example, FIG. 9 shows the current credit balances 912, 914 for each of the two players and as can be seen in FIG. 10, these are removed in the single player mode. Further, as shown in the FIG. 10, the total win meter 1017 is made more prominent than the total win meter 917 in FIG. 9.

FIG. 10 shows the first set of reels 920 and the second set of reels 940 in an example where the gaming machine is operating in a one-player mode. In this example, the single player has elected to place wagers having positive credit values of seventy five (75) credits on both the first set of reels 920 and the second set of reels 940 using touch-screen display 54C. The display shows that the player has bet seventy five (75) credits 1011 on the first set of reels 920 and seventy five (75) credits 1013 on the second set of reels but the player is able to select different amounts to wager on each set of reel. The display shows the total amount bet 1016 and the total credit 1015. That is, FIG. 10 shows that the player can bet on both game instances.

In this example, the outcome evaluator will evaluate both the first set of reels 920 and the second set of reels 940 for winning combinations based on the pay table and the respective amounts wagered on the two sets of reels 920, 940 and make any awards to the meters 644 (e.g. to a win meter). The meters store the current value of the wagers 644A independently for each of the first and second sets of symbols. That is, the meters include a first wager meter and a second wager meter.

Figure 11:
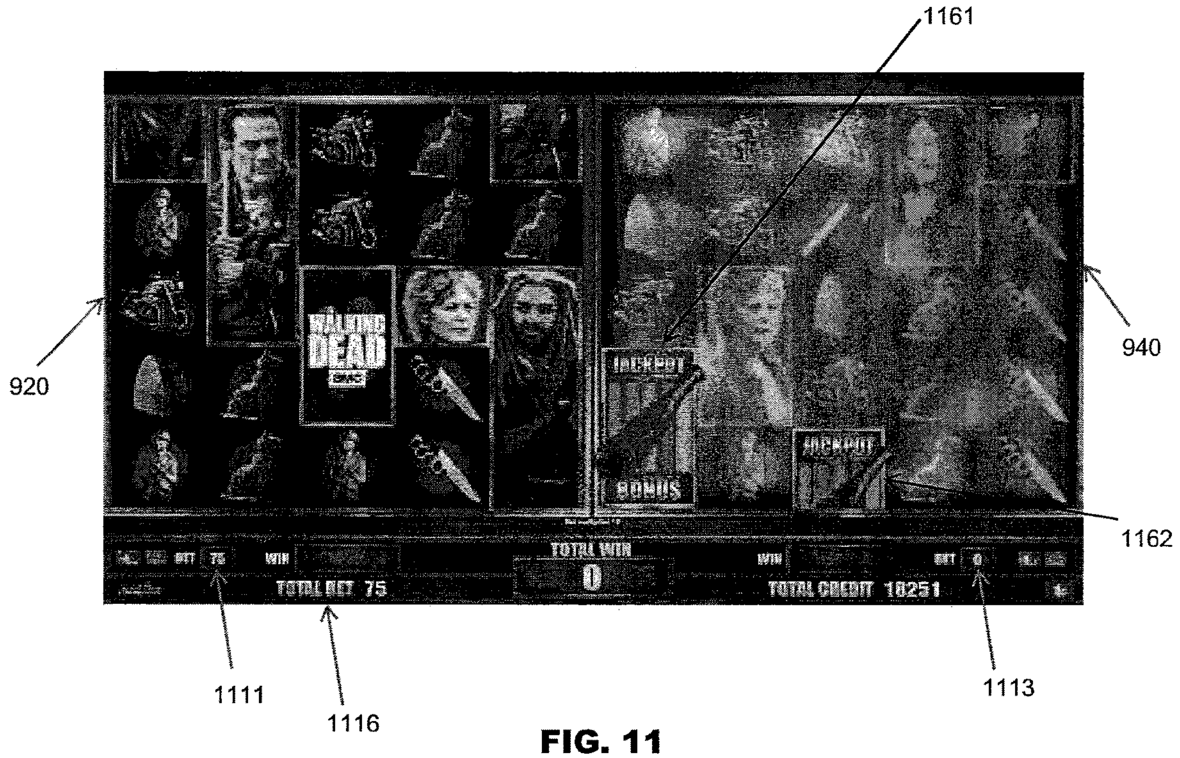
FIG. 11 is a screen shot of the gaming machine operating in a one-player mode with the player wagering seventy five (75) credits one set of columns of symbol display positions and 0 credits one the other set of columns of symbol display positions.

Turning now to FIG. 11, there is shown another example of the gaming machine operating in a one-player mode. In this example, the player has elected to bet seventy five (75) credits 1111 on the first set of reels 920 and 0 credits 1113 on the second set of reels 940. Thus, the total bet is seventy five (75) credits 1116.

Irrespective of the amount wagered per window, all the reels are spun in order to select symbols for display. As shown in FIG. 11, trigger symbols 1161 and 1162 are still treated as live symbols for the purpose of triggering additional game play for the first player even though the outcomes in the second set of reels will not be evaluated from the perspective of making an award of credits from the pay table while the remaining symbols are greyed out by symbol hider 625A which places a "mist" effect over the inactive symbols. That is, the player can wager 0 credits on the second game outcome yet the reels of the second set of reels will still be spun and certain symbols will be active and used in determining whether the player is entitled to additional game play such as a feature game. In an embodiment, the trigger condition is a defined number of the trigger symbols occurring on the first set of reels 920 or the second set of reels 940. In another embodiment, the trigger condition is a defined number of the trigger symbols occurring across both the first set of reels 920 and the second set of reels 940. The same trigger conditions can apply in both the one-player mode and the second-player mode. In an embodiment, when the trigger occurs in a one-player mode, a feature game is carried out on both the first set of reels 920 an the second set of reels 940 irrespective of the first player's wager. In an embodiment, the feature game on the second set of reels may be greyed-out if the first player has made a zero wager on the second set of reels to indicate that the first player will not receive an award.

Figure 12:
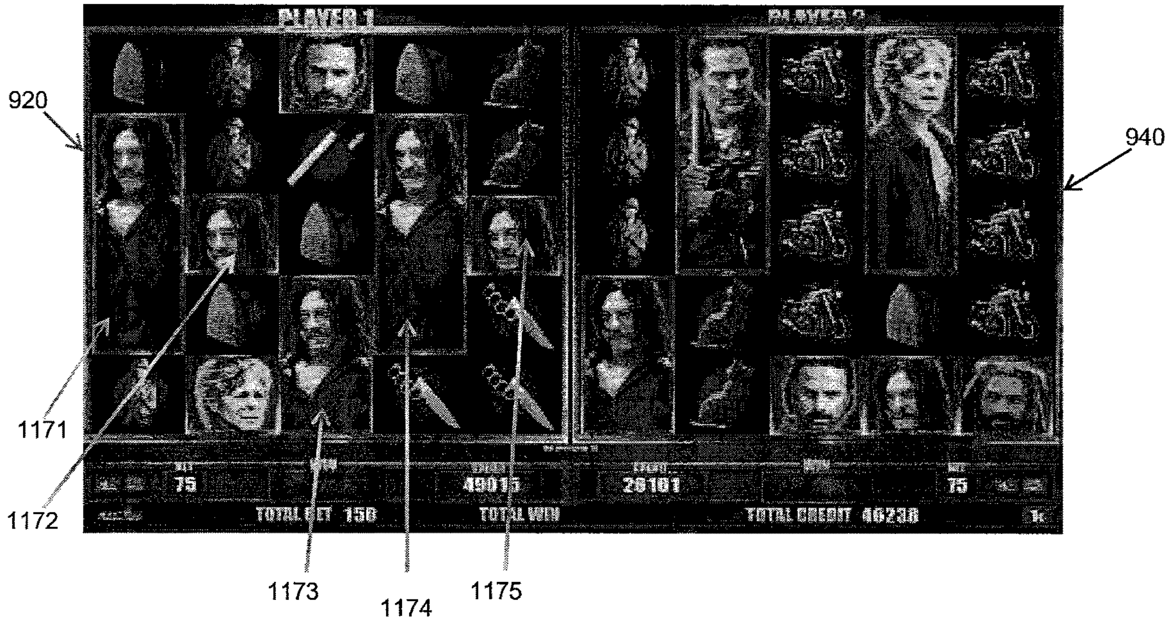
FIG. 12 is an exemplary display of a game outcome including oversized symbols.
Figure 13:
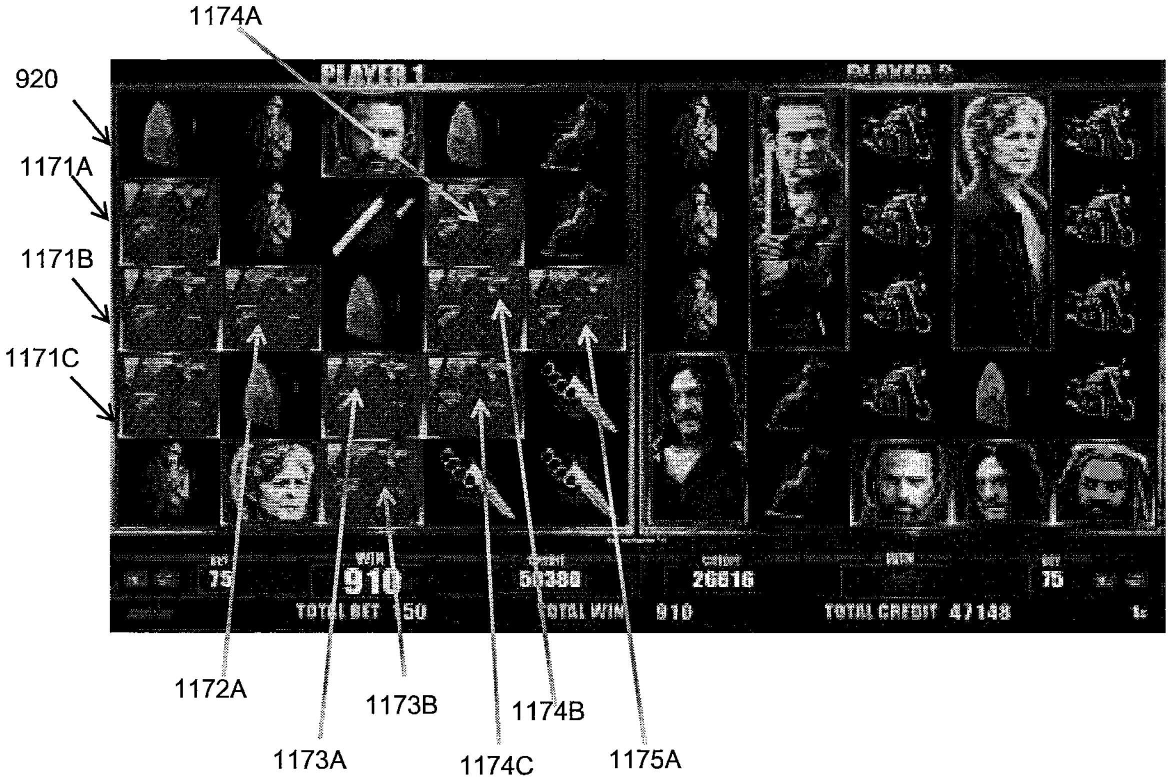
FIG. 13 shows the display of FIG. 12 modified to indicate how the oversized symbols are evaluated.

FIGS. 12 and 13 show the operation of the oversized symbols. The oversized symbols are those symbols which occupy more than one symbol display position. FIG. 12 shows that the first set of reels 920 have spun up a first 3-by-1 symbol 1171 of a specific character, a second 3-by-1 symbol 1174 of the specific character, a 2-by-1 symbol 1173 of the specific character, a first 1-by-1 symbol 1172 of the specific character, and a second 1-by-1 symbol 1175 of the specific character.

FIG. 13 shows that when any one or more of these symbols forms part of a winning symbol combination on the first set of reels 920 the display of the symbol is changed to indicate that the symbols are evaluated as individual symbols. In this example this is achieved by displaying an alternative image of the same character as single symbols. Thus, the first 3-by-1 symbol 1171 of the specific character has been transformed into three single symbols 1171A, 1171B and 1171C. The first 1-by-1 symbol 1172 is transferred into transformed into symbol 1172A. The 2-by-1 symbol 1173 of the specific character is transformed into single symbols 1173A, 1173B. The second 3-by-1 symbol 1174 of the specific character is transformed into symbols 1174A, 1174B, 1174C and the second 1-by-1 symbol 1175 is transformed into symbol 1175A.

Figure 8:
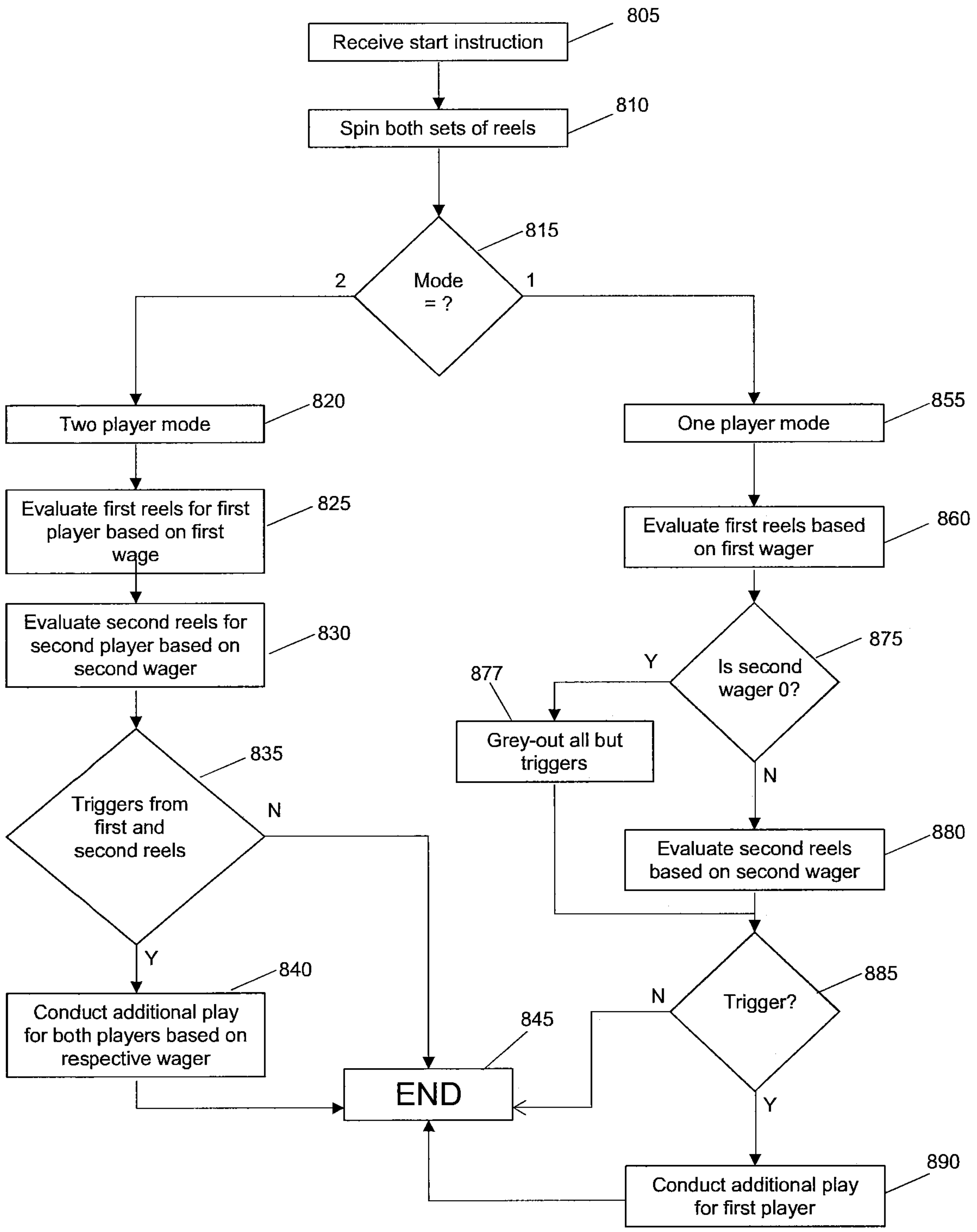
FIG. 8 is a flow chart of an embodiment.

FIG. 8 shows a method 800 of operating a gaming machine according to an embodiment of the disclosure. The method involves receiving start instruction 805 and spinning both sets of reels 810. A decision is made at step 815 as to whether the gaming machine is operating in the first player mode or the second player mode. When operating the two player mode at step 820 the method 800 of operating the gaming machine involves evaluating first reels at step 825 for a first player based on the first wager and evaluating the second reels at step 830 for the second player based on the second wager. Both these evaluations are performed using the pay table at step 642. The method then involves determining whether a trigger condition occurs 835 from the first and second reels in conducting additional play for both players based on their respective wagers 840 before the method ends 845.

In the one-player mode at step 855 the method involves evaluating at step 860 the first set of reels based on the first wager and determining at step 875 whether the second wager is 0 credits. If the second wager is not 0, the method involves evaluating the second reels based on the second wager at step 880. The method then involves determining whether a trigger has occurred across the first and second sets of reels at step 885 and conducting any additional play for the first player at step 890.

If at step 875 is determined that the second wager is 0, then the symbol hider 625A grays out all but the trigger symbols on the second set of reels at step 877. In some embodiments, this may be achieved by retrieving a different visual representation of the second reels from the memory 64 before controlling the display to display the symbols.

As indicated above, typically the additional game play will be in the form of a feature game. Persons skilled in the art will appreciate that a feature game involves some additional element of game play which usually only occurs when a trigger condition is met. Types of feature games include: those where a series of free game events are awarded such as free games or re-spins (where some reels are held while others are re-spun); games where the symbols on the reel are changed; and "second screen" games where game play is totally different to the base game, for example where the player makes selections in a "pick a box type" game.

An example of additional game play is to operate the gaming machine to conduct a game as described in Australian patent application 2017901012 filed 22 Mar. 2017 entitled "A GAMING MACHINE AND A METHOD OF OPERATING A GAMING MACHINE" where a first reel spins in a first direction (e.g. horizontally) and carries prizes and a set of second reels that spin in a second direction transverse to the first direction (e.g. vertically). Each of the second reels is aligned with a position at which one of the prizes of the first reel is displayed after the first reel stops spinning. Each of the reels of the set of second reels has a plurality of symbols including an index symbol. The reels of the set of second reels are spun at least once. When, after spinning of the second reels has finished, there are index symbols displayed on the second reels, these are used to define an index for evaluating the first reel. In an example, each of the prizes indexed by an index symbol is awarded to the player.

Another example of additional game play is conducted with a series of free games. During the free games a special set of reel strips are used that do not include the jackpot feature/free games trigger symbols so that it is not possible to trigger the features from within a free game.

In an example, in the first free game an animated character will enter the display 54B and occupy all symbol positions corresponding to the 10th reel 945 and remain in place for the duration of the first free game.

When the reels stop spinning all wins will be paid in accordance with the game paytable, and treating the animated symbol as wild for all symbols on the last reel of a second game window corresponding to the second set of reels 940. Combinations that include the special character will, in effect, be paid as 5× the paytable win because they will occur 5 times due to the Reel Power evaluation method.

If the outcome of the first free game is a winning combination for which the special character substitutes (even if there is no win paid due to the second game window corresponding to the second set of reels 940 being inactive due to a zero wager in the one-player mode) then the special character remains in the same position for the next free game. If there is no win combination with the special character substituting (i.e. being active) then the special character will animate to move to the next reel, i.e. initially from Reel 10 945 to Reel 9 944. In an example, if when the special character does not advance, an animation is displayed of another character pushing or attacking the special character to cause the special character to stay in place. In a variant, other conditions can cause the special character to move or not move. In one example, the special character moves or stays put depending on whether a value of a win is above a threshold or based on a random determination as to whether the other character's attack is successful. As the movement of the character is dependent on conditions, the length of the series of free games is indeterminate.

If the second game window is inactive due to the trigger bet being '0' on the second window in single player mode then it remains inactive for the duration of the free games. However the special character still moves across the reels in the same fashion even though wins will not be paid in the inactive window.

The free game win is paid with win celebration tier structure exactly as per the base game except that the free game custom rollups and tunes will play instead of the base ones for each tier.

The same process is repeated for every free game with the special character moving to the next reel if no special character substitute wins occur or staying where it is if there is a special character win.

The series of free games continue until the special character is on reel 1 and no win occurs with the special character substituting after which the series of free games completes.

Persons skilled in the art, will appreciate that while this feature game is advantageous in the context of a gaming machine that functions in one-player or two-player mode, it could be implemented in other gaming machines which are only operable by a single player.

A winning outcome will result in an award being made such as an award of credits based on the pay table. Such an award may never actually be physically received by a player.

For example, many gaming systems provide a player with a double or nothing gamble feature, where the player can double or forfeit their credits before commencing another play of the game or cashing out. Further, as credits are fungible, once credits have been added to the credit meter it is not possible to distinguish between credits which exist because the player has input cash or the like and credits resulting from an award.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

For example, an aspect of the disclosure provides a method of operating an electronic gaming machine comprising: a first set of reels corresponding to a first set of columns of symbol display positions, each first reel comprising a plurality of symbols of a symbol set; a second set of reels corresponding to a second set of columns of symbol display positions, each second reel comprising a plurality of symbols of the symbol set; a memory storing a pay table defining awards for winning combinations of symbols applicable to each of the first and second sets of columns of symbol display positions; and a plurality of buttons including first buttons to enable a first wager to be selected from one of a first plurality of different positive credit value wager amounts, the first wager applying to symbols displayed in the first set of columns of symbol display positions, and second buttons to enable a second wager amount to be selected from a zero amount and one of a second plurality of positive credit value wager amounts, the second wager applying to symbols displayed in the second set of columns of symbol display positions, the method comprising controlling, irrespective of the wagers applied to each of the first and second sets of columns, each reel of the first and second sets of reels to spin to a respective stop position to thereby select, at the conclusion of the spinning, symbols that fill the columns of symbol display positions; evaluating the symbols displayed in the first set of columns of symbol display positions based on the pay table and the first wager, and make any awards for winning combinations of symbols; and evaluating the symbols displayed in the second set of columns of symbol display positions based on the pay table and the second wager, and make any awards for winning combinations of symbols, wherein a zero wager amount results in no award.

In an embodiment, the method comprises: evaluating the symbols displayed in the first and second sets of columns of symbol display positions to determine whether a trigger condition is met; and upon the trigger condition being met, conducting additional game play corresponding to the trigger condition.

In another aspect, the disclosure provides an electronic gaming machine comprising: a first set of reels corresponding to a first set of columns of symbol display positions, each first reel comprising a plurality of symbols of a symbol set; a second set of reels corresponding to a second set of columns of symbol display positions, each second reel comprising a plurality of symbols of the symbol set; a memory storing a pay table defining awards for winning combinations of symbols applicable to each of the first and second sets of columns of symbol display positions; a plurality of buttons including first buttons to enable a first wager to be selected from one of a plurality of different first wager amounts, the first wager applying to symbols displayed in the first set of columns of symbol display positions, and second buttons to enable a second wager amount to be selected from a plurality of second wager amounts, the second wager applying to symbols displayed in the second set of columns of symbol display positions; and a game controller configured to: control, irrespective of the wagers applied to each of the first and second sets of columns, each reel of the first and second sets of reels to spin to a respective stop position to thereby select, at the conclusion of the spinning, symbols that fill the columns of symbol display positions; evaluate the symbols displayed in the first set of columns of symbol display positions based on the pay table and the first wager, and make any awards for winning combinations of symbols; evaluate the symbols displayed in the second set of columns of symbol display positions based on the pay table and the second wager, and make any awards for winning combinations of symbols; evaluate the symbols displayed in the first and second sets of columns of symbol display positions to determine whether a trigger condition is met; and upon the trigger condition being met, conduct additional game play corresponding to the trigger condition.

In yet another aspect, the disclosure provides a method of operating an electronic gaming machine comprising: a first set of reels corresponding to a first set of columns of symbol display positions, each first reel comprising a plurality of symbols of a symbol set; a second set of reels corresponding to a second set of columns of symbol display positions, each second reel comprising a plurality of symbols of the symbol set; and a memory storing a pay table defining awards for winning combinations of symbols applicable to each of the first and second sets of columns of symbol display positions; and a plurality of buttons including first buttons to enable a first wager to be selected from one of a plurality of different first wager amounts, the first wager applying to symbols displayed in the first set of columns of symbol display positions, and second buttons to enable a second wager amount to be selected from a plurality of second wager amounts, the second wager applying to symbols displayed in the second set of columns of symbol display positions, the method comprising controlling, irrespective of the wagers applied to each of the first and second sets of columns, each reel of the first and second sets of reels to spin to a respective stop position to thereby select, at the conclusion of the spinning, symbols that fill the columns of symbol display positions; evaluating the symbols displayed in the first set of columns of symbol display positions based on the pay table and the first wager, and make any awards for winning combinations of symbols; evaluating the symbols displayed in the second set of columns of symbol display positions based on the pay table and the second wager, and make any awards for winning combinations of symbols; evaluating the symbols displayed in the first and second sets of columns of symbol display positions to determine whether a trigger condition is met; and upon the trigger condition being met, conducting additional game play corresponding to the trigger condition.

In still another aspect, the disclosure provides an electronic gaming machine comprising: a first set of reels corresponding to a first set of columns of symbol display positions, each first reel comprising a plurality of symbols of a symbol set; a second set of reels corresponding to a second set of columns of symbol display positions, each second reel comprising a plurality of symbols of the symbol set; a memory storing a) a pay table defining awards for winning combinations of symbols applicable to each of the first and second sets of columns of symbol display positions, and b) a plurality of meters; and a game controller configured to operate in a one-player mode or a two-player mode responsive to at least one instruction input to the gaming machine, control the display to display at least a subset of the meters, and respond to switching between the one-player mode and the two-player mode by changing the display of the at least a subset of the meters on the display.

In an embodiment, the controller changes the appearance of at least one of the meters.

In an embodiment, the controller adds at least one meter or removes at least one meter from the meters displayed on the display.

In yet another aspect, the disclosure provides a method of operating an electronic gaming machine comprising: a first set of reels corresponding to a first set of columns of symbol display positions, each first reel comprising a plurality of symbols of a symbol set; a second set of reels corresponding to a second set of columns of symbol display positions, each second reel comprising a plurality of symbols of the symbol set; a memory storing a) a pay table defining awards for winning combinations of symbols applicable to each of the first and second sets of columns of symbol display positions, and b) a plurality of meters, the method comprising: operating in a one-player mode or a two-player mode responsive to at least one instruction input to the gaming machine, controlling the display to display at least a subset of the meters, and responding to switching between the one-player mode and the two-player mode by changing the display of the at least a subset of the meters on the display.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

It will be understood to persons skilled in the art of the disclosure that many modifications may be made without departing from the spirit and scope of the disclosure, in particular it will be apparent that certain features of embodiments of the disclosure can be employed to form further embodiments.

It is to be understood that, if any prior art is referred to herein, such reference does not constitute an admission that the prior art forms a part of the common general knowledge in the art in any country.

In the claims which follow and in the preceding description of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

What is claimed is:

1. An electronic gaming machine comprising:

a display device providing a first win meter associated with a first set of reels having a first plurality of display positions and a second win meter associated with a second set of reels having a second plurality of display positions;

a player interface enabling a first wager selection to be selected from one of a first plurality of different positive credit value wager amounts, the first wager selection applying to the first set of reels, and a second wager selection to be selected from a zero wager amount and a second plurality of positive credit value wager amounts, the second wager selection applying to the second set of reels; and a game controller having a processor and memory storing a symbol set, a pay table that defines awards for winning combinations of symbols applicable to each of the first set of reels and the second set of reels, and a plurality of instructions, which, when executed, cause the processor to at least:

control the display device, irrespective of the first wager selection and the second wager selection applied to each of the first set of reels and the second set of reels, to animate spinning of the first set of reels and the second set of reels, select from the symbol set stored in memory a first plurality of symbols and a second plurality of symbols, respectively, where the first plurality of symbols and the second plurality of symbols are randomly selected from the symbol set based on a random number generated by a random number generator, in response to the first plurality of symbols and the second plurality of symbols having been randomly selected, control the display device to animate filling of the first plurality of display positions and the second plurality of display positions with the first plurality of symbols and the second plurality of symbols, respectively, when the first set of reels and the second set of reels stop spinning, and control the display device to display the first win meter and the second win meter to display an award for a winning combination of symbols evaluated from the first plurality of symbols based on the first wager selection and the second wager selection, respectively, and based on the pay table, wherein the zero wager amount results in zero award.

2. The electronic gaming machine of claim 1, wherein the instructions, when executed, further cause the processor to:

evaluate the first plurality of symbols and the second plurality of symbols to determine whether a trigger condition is met; and upon the trigger condition being met, conduct one or more additional game plays corresponding to the trigger condition.

3. The electronic gaming machine of claim 1, wherein the first wager selection and the second wager selection are received at a first virtual button and a second virtual button on the player interface, respectively.

4. The electronic gaming machine of claim 1, wherein the first wager selection and the second wager selection are received via a first reconfigurable physical button and a second reconfigurable physical button, respectively.

5. The electronic gaming machine of claim 1, wherein the instructions, when executed, further cause the processor to enter one of a one-player mode and a two-player mode via at least one of the first wager selection and the second wager selection.

6. The electronic gaming machine of claim 5, wherein in the two-player mode, at least one of the first wager selection and the second wager selection is further configured to independently specify one of a plurality of different wager amounts to apply to the first set of reels and the second set of reels, respectively.

7. The electronic gaming machine of claim 5, wherein in the one-player mode, the first wager selection and the second wager selection are further configured to independently specify one of a plurality of different wager amounts to apply to the first set of reels and the second set of reels, respectively, and wherein the second wager selection corresponds to a zero wager selection in respect of the second set of reels.

8. A method of operating a game on an electronic gaming machine comprising a player interface, a first win meter associated with a first set of reels having a first plurality of display positions, a second win meter associated with a second set of reels having a second plurality of display positions, a first plurality of different positive input selection including a first input selection applicable to the first set of reels, a second plurality of different input selection including a zero input selection and a second input selection applicable to the second set of reels, and a game controller having a processor and memory storing a symbol set and a pay table, the pay table defines a plurality of win outcomes for respective winning symbol combinations applicable to each of the first set of reels and the second set of reels, the method comprising:

sending from the player interface to the game controller a signal indicative of the first input selection and the second input selection;

controlling, by the game controller, a display irrespective of the first input selection and the second input selection, to animate spinning of the first set of reels and the second set of reels;

selecting from the symbol set stored in memory a first plurality of symbols and a second plurality of symbols, respectively, where the first plurality of symbols and the second plurality of symbols are randomly selected from the symbol set based on a random number generated by a random number generator;

in response to the first plurality of symbols and the second plurality of symbols having been randomly selected, controlling, by the game controller, the display to animate filling of the first plurality of display positions and the second plurality of display positions as the first set of reels and the second set of reels stop spinning;

determining from the pay table stored in the memory whether a symbol combination resulting a win outcome is applicable respectively to each of the first set of reels and the second set of reels, the symbol combination is evaluated based on the first plurality of symbols and the second plurality of symbols, the first input selection and the second input selection, respectively, and the pay table, wherein the second win meter is not changed with the zero input selection; and responsive to the symbol combination including the win outcome, controlling, by the game controller, the display to animate the win outcome on the first win meter and on the second win meter.

9. The method of claim 8, further comprising:

evaluating the first plurality of symbols and the second plurality of symbols to determine whether a trigger condition is met; and upon the trigger condition being met, conducting one or more additional game plays corresponding to the trigger condition.

10. The method of claim 8, further comprising receiving the first input selection and the second input selection at a first virtual button and a second virtual button, respectively.

11. The method of claim 8, further comprising receiving the first input selection and the second input selection at a first reconfigurable physical button and a second reconfigurable physical button, respectively.

12. The method of claim 8, further comprising entering one of a one-player mode and a two-player mode via at least one of the first input selection and the second input selection.

13. The method of claim 12, further comprising, in the two-player mode, at least one of the first input selection and the second input selection independently specifying one of a plurality of different wager amounts to apply to the first set of reels and the second set of reels, respectively.

14. A non-transitory computer-readable medium comprising a pay table that defines outcomes for winning symbol combinations, and a plurality of instructions for conducting a game on an electronic gaming device that includes a first win meter, a first set of reels having a first plurality of display positions, a second win meter, a second set of reels having a second plurality of display positions, a first plurality of different positive input selection including a first input selection applicable to the first set of reels, a second plurality of different input selection including a zero input selection and a second input selection applicable to the second set of reels, and a game controller having a processor, and the instructions, which, when executed cause the processor to perform at least the steps of:

initiating, irrespective of the first input selection and the second input selection applied to each of the first set of reels and the second set of reels, an animation of the first set of reels and the second set of reels to visually spin;

in response to the processor receiving a signal indicative that the first set of reels and the second set of reels stopped spinning, controlling the first plurality of display positions and the second plurality of display positions to be visually filled with a first plurality of symbols and a second plurality of symbols, respectively, randomly selected from the symbol set based on a random number generated by a random number generator; and controlling the first win meter and the second win meter to display an outcome for a winning combination of symbols evaluated from the first plurality of symbols based on the first input selection and the second input selection, respectively, and based on the pay table, wherein the zero input selection results in not changing the second win meter.

15. The non-transitory computer-readable medium of claim 14, wherein the instructions, when executed, further cause the processor to perform the steps of evaluating the first plurality of symbols and the second plurality of symbols to determine whether a trigger condition is met, and upon the trigger condition being met, conducting one or more additional game plays corresponding to the trigger condition.

16. The non-transitory computer-readable medium of claim 14, wherein the instructions, when executed, further cause the processor to perform the step of receiving the first input selection and the second input selection at a first virtual button and a second virtual button, respectively.

17. The non-transitory computer-readable medium of claim 14, wherein the instructions, when executed, further cause the processor to perform the step of receiving the first input selection and the second input selection at a first reconfigurable physical button and a second reconfigurable physical button, respectively.

18. The non-transitory computer-readable medium of claim 14, wherein the instructions, when executed, further cause the processor to perform the step of entering one of a one-player mode and a two-player mode via at least one of the first input selection and the second input selection.

19. The non-transitory computer-readable medium of claim 18, wherein the instructions, when executed, further cause the processor to perform the step of, in the two-player mode, at least one of the first input selection and the second input selection independently specifying one of a plurality of different wager amounts to apply to the first set of reels and the second set of reels, respectively.

20. The non-transitory computer-readable medium of claim 18, wherein the instructions, when executed, further cause the processor to perform the step of, in the one-player mode, the first input selection and the second input selection independently specifying one of a plurality of different wager amounts to apply to the first set of reels and the second set of reels, respectively, and wherein the second input selection corresponds to a zero wager amount in respect of the second set of reels.

* * * * *